(12) United States Patent
Zhao et al.

(10) Patent No.: US 12,263,744 B2
(45) Date of Patent: Apr. 1, 2025

(54) ELECTRIC VEHICLE CHARGING PLUG WITH SEALS

(71) Applicants: Volex Interconnect Systems (Suzhou) Co., Ltd., Suzhou (CN); Volex PLC, Basingstoke (GB)

(72) Inventors: ChangChun Zhao, Guangdong (CN); Mui Lian Jessica Toh, Singapore (SG)

(73) Assignees: Volex Interconnect Systems (Suzhou) Co., Ltd., Suzhou (CN); Volex PLC, Basingstoke (GB)

( * ) Notice: Subject to any disclaimer, the term of this patent is extended or adjusted under 35 U.S.C. 154(b) by 395 days.

(21) Appl. No.: 17/751,485

(22) Filed: May 23, 2022

(65) Prior Publication Data

US 2023/0286397 A1    Sep. 14, 2023

(30) Foreign Application Priority Data

Mar. 11, 2022    (CN) .......................... 202210243952.0

(51) Int. Cl.
*B60L 53/16*    (2019.01)
*H01R 13/14*    (2006.01)
(Continued)

(52) U.S. Cl.
CPC .............. *B60L 53/16* (2019.02); *H01R 13/14* (2013.01); *H01R 13/5202* (2013.01);
(Continued)

(58) Field of Classification Search
CPC ..... B60L 53/16; H01R 13/14; H01R 13/5202; H01R 13/6683; H01R 2201/26; H01R 13/405; H01R 13/5845
See application file for complete search history.

(56) References Cited

U.S. PATENT DOCUMENTS

| | | | |
|---|---|---|---|
| 2017/0207583 A1 | 7/2017 | Wu et al. | |
| 2021/0336393 A1 | 10/2021 | Zhao et al. | |
| 2023/0099692 A1* | 3/2023 | Raschilla | H01R 24/30 |
| | | | 320/109 |

FOREIGN PATENT DOCUMENTS

| | | | | |
|---|---|---|---|---|
| CN | 203300850 U | * | 11/2013 | ........... H01R 13/405 |
| CN | 109346878 A | | 2/2019 | |

(Continued)

OTHER PUBLICATIONS

International Patent Application No. PCT/IB2022/000290; Int'l Search Report and the Written Opinion; dated Nov. 22, 2022; 17 pages.

(Continued)

*Primary Examiner* — Renee S Luebke
*Assistant Examiner* — Paul D Baillargeon
(74) *Attorney, Agent, or Firm* — BakerHostetler

(57) ABSTRACT

An electric vehicle charging plug that comprises at least one temperature sensor for monitoring an internal temperature of the electric vehicle plug. The electric vehicle charging plug further comprises a data cable conveys temperature data to a physically separate controller. The electric vehicle charging plug further comprises a housing or holder for receiving the at least one temperature sensor, wherein the housing is capable of being embedded within an inner-mold of the electric vehicle plug. A first seal seals a junction between the at least one pin/blade and a faceplate or bridge plate. A second seal seals both a junction between the at least one pin/blade and a faceplate or bridge plate and the inner-mold. A third seal provided by the inner-mold seals the entire interior of the electric vehicle plug.

20 Claims, 18 Drawing Sheets

(51) Int. Cl.
*H01R 13/405* (2006.01)
*H01R 13/52* (2006.01)
*H01R 13/66* (2006.01)

(52) U.S. Cl.
CPC ....... *H01R 13/6683* (2013.01); *H01R 13/405* (2013.01); *H01R 2201/26* (2013.01)

(56) References Cited

FOREIGN PATENT DOCUMENTS

| | | | |
|---|---|---|---|
| CN | 110676648 | A | 1/2020 |
| CN | 212784120 | U | 3/2021 |
| EP | 3402010 | A1 | 11/2018 |
| EP | 3700025 | A1 | 8/2020 |
| EP | 3758164 | A1 | 12/2020 |
| EP | 3863123 | A1 | 8/2021 |
| JP | 2013-065473 | A | 4/2013 |
| JP | 2016-136453 | A | 7/2016 |
| JP | 3225148 | U | 2/2020 |
| JP | 2020-536369 | A | 12/2020 |
| KR | 2017-0087121 | A | 7/2017 |
| KR | 2021-0113997 | A | 9/2021 |
| TW | 201414110 | A | 4/2014 |
| WO | WO-2006066518 | A1 * | 6/2006 .......... H01R 13/405 |
| WO | WO 2018/105809 | A1 | 6/2018 |

OTHER PUBLICATIONS

European Patent Application No. 22176431.9; Extended Search Report; dated Nov. 10, 2022; 12 pages.
International Patent Application No. PCT/IB2022/000290; Int'l Preliminary Report on Patentability; Jun. 3, 2024; 24 pages.

* cited by examiner

ELECTRIC VEHICLE CHARGING PLUG WITH SEALS

TECHNICAL FIELD

The present disclosure relates to an electrical connector, and more particularly to an electric vehicle charging plug with seals.

BACKGROUND

Electrical plugs are commonly used to supply power to electrical appliances, such as electric toasters and kettles and electrical vehicle charging devices, some of which draw more current than other powered devices. Conventional electrical plugs typically do not include protective mechanisms for higher current draw applications which may cause the plugs to be subject to overheating, melting, or burning. As a result, conventional electrical plugs may become damaged and may cause unsafe conditions. However, adding protective mechanisms increases the potential that when the electrical plugs are exposed to wet environments, moisture can enter the plug, damage the protective mechanisms, and result in additional damage and unsafe conditions. There is thus a need for improvements to electric vehicle plugs, and particularly with respect to the seals used therein.

SUMMARY

In accordance with an aspect of the present disclosure, there is provided an electric vehicle charging plug that comprises at least one temperature sensor for monitoring an internal temperature of the electric vehicle plug. The electric vehicle charging plug further comprises a data cable that conveys temperature data to a physically separate controller. The electric vehicle charging plug further comprises a housing or holder for receiving the at least one temperature sensor, wherein the housing/holder is capable of being embedded within an inner-mold of the electric vehicle plug. A first seal may seal a junction between the at least one pin/blade and a faceplate or bridge plate. A second seal may seal both a junction between the at least one pin/blade and a faceplate or bridge plate and junctions between the same and the inner-mold. A third seal provided by the inner-mold seals the entire interior of the electric vehicle plug.

In an embodiment, the first seal may be formed by a combination of epoxy, gaskets, sealing oils, sealing greases, and/or Cold melt adhesive formed around a pin or between a junction between the pin/blade and a separate ring or cap. In an embodiment, the second seal may be formed by the separate ring or cap and upper portions of blades that press the ring or cap onto the first seal. In an embodiment, the second seal may be formed by the separate ring or cap.

In an embodiment, the at least one temperature sensor may be provided by an integrated circuit temperature sensor on a printed circuit board assembly ("PCBA") housed within a PCBA potting. In an embodiment, the at least one temperature sensor may be provided by thermistors housed within highly thermally conductive ceramic housings positioned around and close to the upper portions of the blades.

Embodiments also include methods for assembling the plugs described herein. In an aspect, a method of assembling an electric vehicle plug, includes forming a faceplate including an outer surface and a plurality of raised portions and lowered portions formed on an inner surface, some of the raised portions partially forming slots through which two or more pins are extended, and one or more of the raised portions forming a bracket positioned on an inward facing surface of the faceplate; inserting the two or more pins into two or more slots among the slots, the two or more pins comprising a live pin and a neutral pin, each pin including a through hole that extends through a central portion of the pin and is filled by the faceplate; inserting at least one temperature sensor into a sensor housing, the at least one temperature sensor configured to monitor an internal temperature of either the live pin, the neutral pin, or both the live pin and the neutral pin; positioning the sensor housing on the bracket, the sensor holder configured to hold the at least one temperature sensor adjacent the bracket and adjacent either the live pin, the neutral pin, or both the live pin and the neutral pin; forming first seals around each of the two or more pins and the inward facing surface of the faceplate, the first seals being supported by ledges formed within the slots; forming second seals around each of the two or more pins and covering the first seals with a material in a manner sufficient to protect the first seals from pressure and heat associated with an injection molded third seal in the form on an inner-mold that covers at least the second seals and the lowered portions of the faceplate; connecting a data cable to the at least one temperature sensor, the data cable configured to transmit temperature data to a controller that is not part of and is physically separated from the plug; and covering the inner-mold and an outer surface of the faceplate with an outer-mold.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

The present disclosure describes an improved electric vehicle charging plug that is capable of accurately monitoring temperature of the plug and conveying temperature data to a controller outside of the plug that can cut power to plug if the plug is overheating. Once the temperature of the electric plug passes a predetermined threshold, the controller may automatically cut off an electric circuit so as to avoid damaging the electrical plug and creating unsafe conditions. As electric vehicle plugs may be exposed to outdoor environmental conditions, including heavy mist, fog, heavy rain, blowing rain, snow, etc., additional sealing components are required to ensure that moisture is not able to enter the plug and cause a short or to disable the temperature sensing devices.

While embodiments depict a three-pin electric vehicle plug for connecting to a power socket, it is to be understood that the present disclosure is not limited to just this type of plug. Any type of electric vehicle charging plug may benefit from the same improvements disclosed herein, including those with only two pins and those with more than three pins in a primary plug, such as any of the plugs shown in FIGS. 17A, 17B, 17C, 17D and 17E. The present disclosure may also improve plugs for connecting to the socket of a vehicle, such as SAE J1772, IEC Type 2, TESLA and CHAdeMO, and electric vehicle plugs with pins in multiple plug components, including SAE J1772 CCS and IEC Type 2 CCS. Electrical plugs in the present disclosure may also be used for plugs of any voltage standard as well as plugs supporting two or more voltage standards. The electrical plugs can be any shape, size, and type, such as type A and C-N and suitable for any voltage.

When referencing elements illustrated in each of the figures, the numbered label corresponding to each element will start with a number corresponding to the figure in which it is first discussed and best illustrated. For example, if an element is first discussed with reference to FIG. 1, the label for the element will follow the format 1NN, and when reference an element first discussed with reference to FIG. 2, the label for the element will follow the format 2NN, etc.

Figure 1:
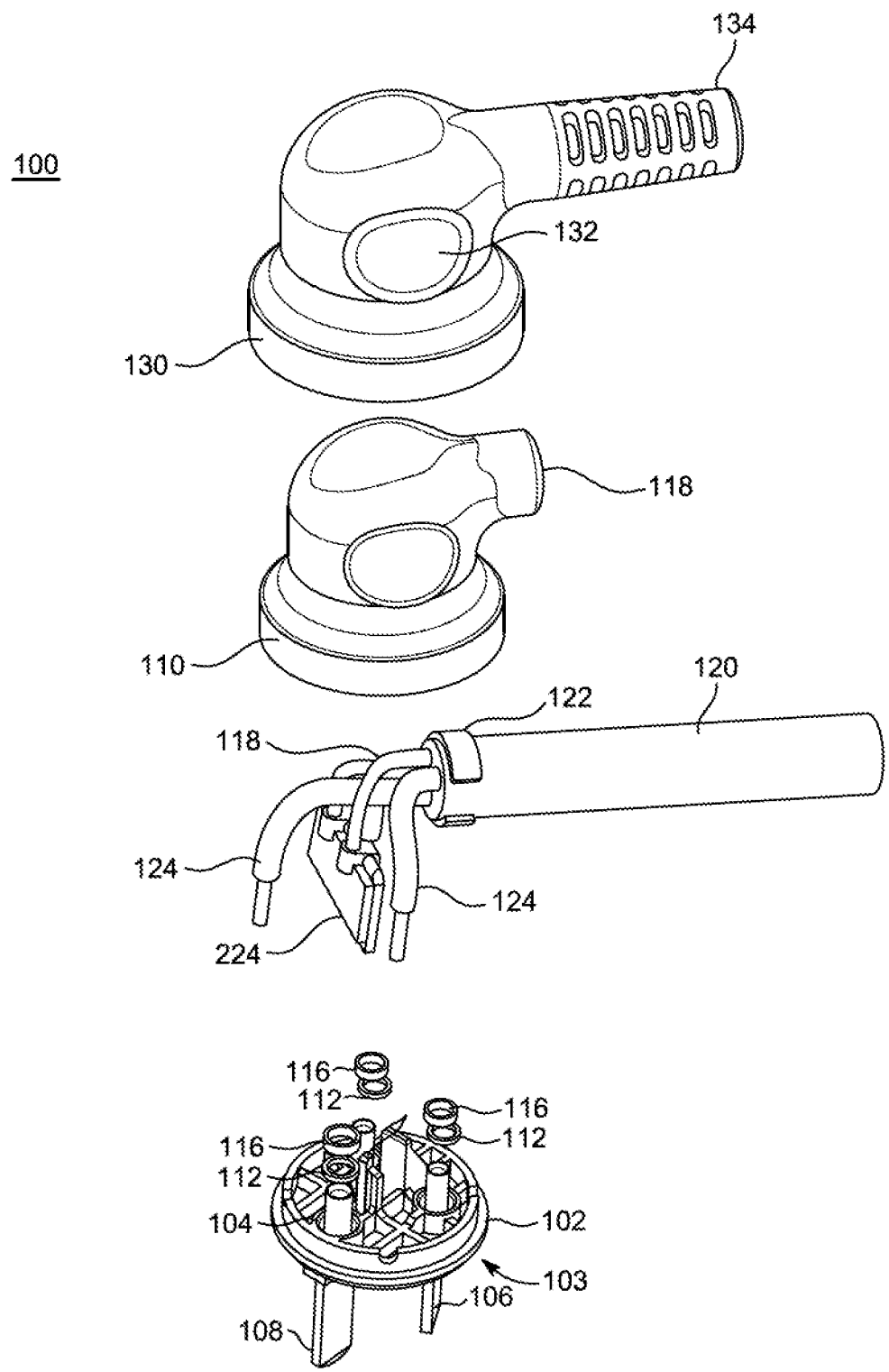
FIG. 1 illustrates an exploded perspective view of an electric vehicle charging plug in accordance with an embodiment of the present disclosure.

FIG. 1 illustrates an exploded perspective view of an embodiment of an electric vehicle charging plug 100 in accordance with a first embodiment. The electric vehicle charging plug 100 includes a faceplate 102 within which are formed a number of slots 104 sufficient to correspond to the pins 106 and 108 of the electric vehicle charging plug 100. The pins 106 and 108 may be round pins or blades depending on the type of plug and may be formed of any suitable material, such as Brass. While reference is made to blades or blade pins with respect to the live, neutral and ground pins, depending on the plug standard for a particular country, all of the pins may be round, all of the pins may be blade pins, or some combination of round pins and blade pins. The faceplate 102 may be made of any suitable material, including Polypropylene ("PP"), Polybutylene Terephthalate ("PBT") and Polycarbonate ("PC"). Each of the slots 104 of the faceplate 102 may be uniquely shaped to snuggly match the shape of the portion of the pins 106 and 108 that are inserted into the slots 104.

Figure 2:
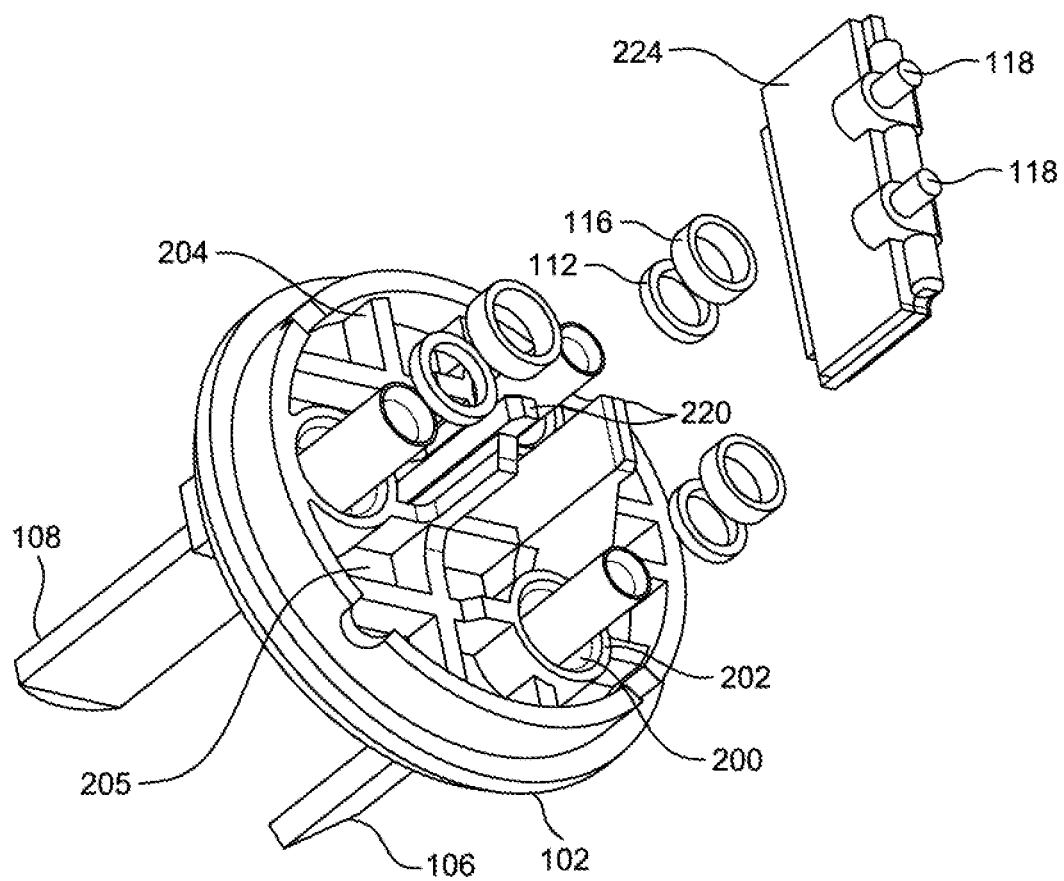
FIG. 2 illustrates an exploded perspective view of the bridge components of the embodiment of FIG. 1.
Figure 3:
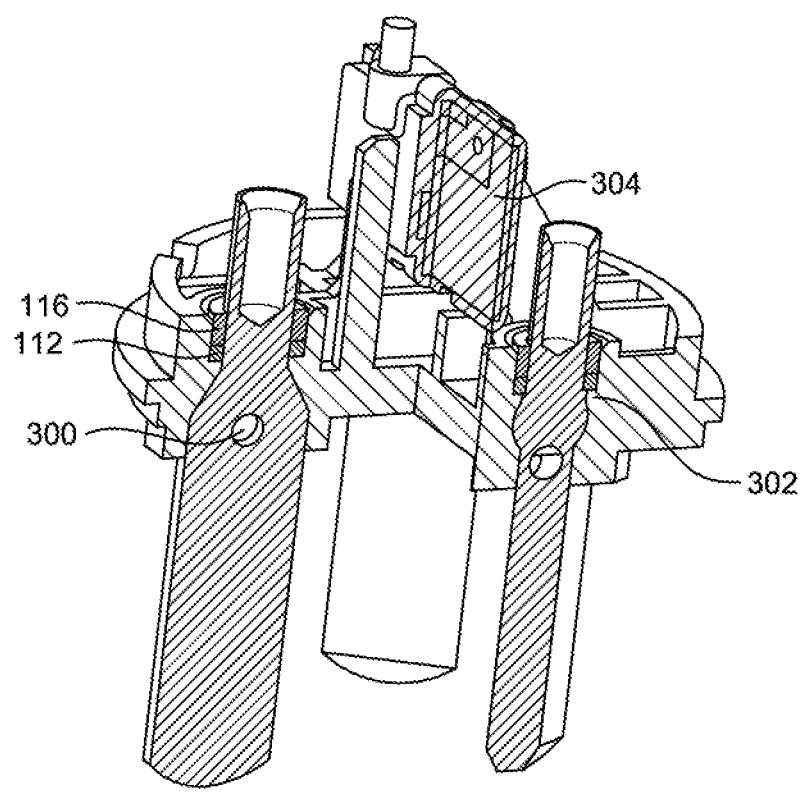
FIG. 3 is a cross-sectional view of the bridge components of FIG. 1.
Figure 4:
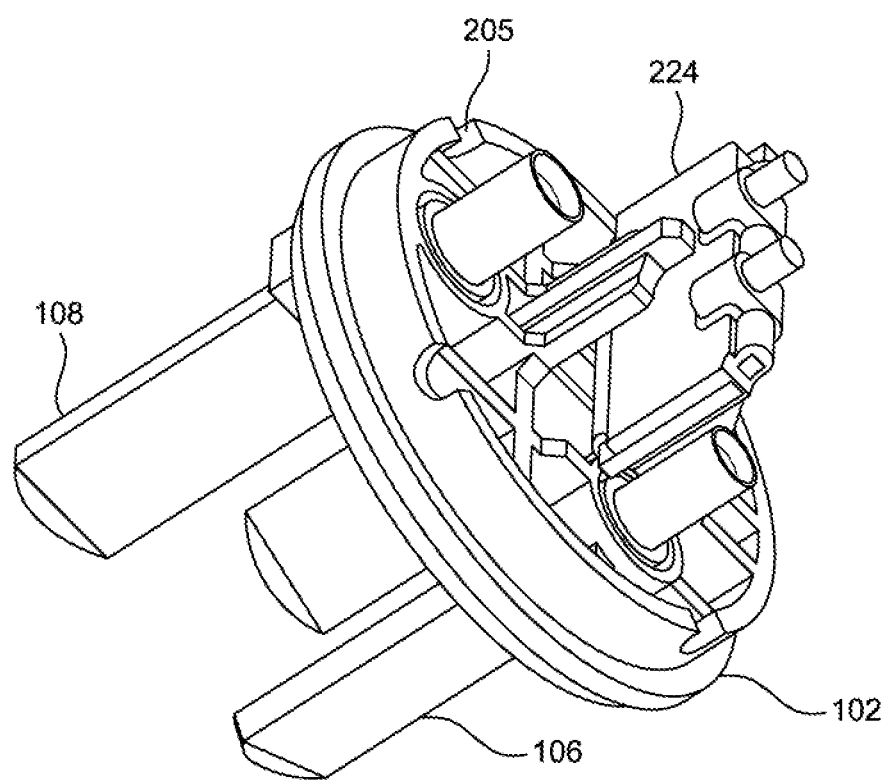
FIG. 4 illustrates a further perspective view of the bridge components of FIG. 1 when fully assembled.

With reference to FIGS. 2-4, the slots 104 may be formed within an interior facing side or surface of the faceplate 102. An outer facing side or surface 103 of the faceplate 102 would face the power socket (not shown) to which the electric vehicle charging plug 100 would be connected during a powering cycle. Each of the slots 104 may be formed by raised areas or portions 202 of the faceplate so as to form a central opening 200 with interior facing walls that mate with each pin 106 or pin 108. The interior facing walls may be configured to be slightly bigger than the circumference of the corresponding pins 106 or 108 so that the pin fits snuggly within the central opening 200 of the slots 104. The pins 106 and 108 may be positioned in the mold (not shown) that is used to form the faceplate 102 so that the material used to form the faceplate 102 flows into the through holes 300 in each pin. This may hold the pins 106 and 108 in place during use and hence through holes 300 may act as a fixation element and prevent movement of pins relative to the faceplate 102. In embodiments, the through holes 300 may not be used because space limitations associated with the design of the plug requires the pins to be crimped outside of the faceplate and then assembled into the faceplate. The design of the pins may be different as a result, such as including raised rings or recessed reliefs around the pins that engage with the material of the faceplate and prevent the pins from moving relative to the faceplate once assembled. The raised portions 202 of the faceplate 102 may include a number of protruding areas 204 and recessed areas 205 and create a number of lowered portions that form nooks and crannies within the faceplate 102 that may be filled by the material of the inner-mold 110, when the inner-mold is formed, as further described herein. Filling the nooks and crannies of the faceplate 102 with the inner-mold 110 forms a third seal (the first and second seals will be described below) of the interior of the electric vehicle charging plug 100 from moisture.

Seals 112 may be a gasket, epoxy, sealing oils, sealing greases, Cold melt adhesive, or a combination of the same that are positioned around further sealed portions of the pins 106 and 108 as a first seal against moisture and other materials, such as dust and sand, entering the electric vehicle charging plug 100. The seal 112 may be an O-ring type gasket that fits snuggly around the pins 106 and 108 to insure a good sealing engagement with the material of the faceplate 102. The seals 112 may be supported by a ledge 302 formed within the slot 104 of the pin 106/108. The seal 112 may be formed of any suitable material, including Epoxy, Cold melt, sealing oils, sealing grease, Nitrile, Neoprene, Ethylene Propylene, Silicone, Fluorocarbon, and PTFE, that has good adhesion with metal or plastic surfaces. The seal 112 may be configured to be any shape suitable to engage with the pins 106/108 and the material of the faceplate 102 and form a tight moisture proof first seal.

The seals 112 may be formed in a shape that matches the shape of the ledge 302 formed within the slots 104 of the pins 106/108. Certain pins or blades may have raised metal rings (not shown) around the pin within which the seals 112 may be positioned or include shoulders and other components (not shown) that extend along the perimeter of the rounded portion of the pin and require the slots 104, ledges 302 and seals to have different shapes. In such a case, the shape of the seal 112 may be formed as a cylinder, a three-dimensional rectangle, polygon, or irregular shape depending on the shape and size of the ledge 302 of the corresponding slot 104.

In some embodiments, a pin may form a ledge that supports a seal 112 instead of, or in addition to, a ledge 302 formed in the material of the faceplate 102. For example, a ledge formed in the material of the faceplate 102 may support a pin ledge, and the pin ledge may support the seal 112. In this example, the ledge in the faceplate material directly supports the pin, while the ledge in the faceplate material indirectly supports the seal 112 via the pin.

A plastic cap 116, formed of PP, PBT, PC or another suitable material, may be positioned on top of each seal 112 within each slot 104, as shown in FIG. 3. The shape of the plastic cap 116 may be a cylinder, a three-dimensional rectangle, polygon, or irregular shape depending on the shape and size of the ledge 302 of the corresponding slot 104 so that it matches the shape of the epoxy, Cold melt adhesive, sealing oils, sealing greases, and/or gasket 112. If the pin includes rings or other components, the cap 116 may rest on top of the upper ring of two metal rings or other components. The inner-mold 110 may be formed of the same material as the plastic cap 116 and the faceplate 102. Utilizing the same material for the faceplate 102, the cap 116 and the inner-mold 110 insures very good bonding performance between those components, which helps to further seal the electric vehicle charging plug 100 as further described herein.

The inner-mold 110 may be injection molded during manufacture of the electric vehicle charging plug 100. While the melted plastic of the inner-mold is injected in a liquid state, the ring 116 and the faceplate 102 may be in a solid state such that the cap 116 and the faceplate 102 are covered by the plastic for the inner-mold 110. The plastic of the inner-mold 110 may be injected under a sufficiently high pressure and a sufficiently high temperature necessary to ensure that the melted plastic material of the inner-mold 110 fully fills all of the nooks and crannies of the faceplate 102 and other internal components of the electric vehicle charging plug 100. By filling the nooks and crannies of the faceplate 102 and covering other internal components of the electric vehicle charging plug 100, including the cap 116, the inner-mold 110 may form the third seal between the cap 116 and the pins 106 and blades 108. The cap 116 may have a shape sufficient to cover all of the epoxy, Cold melt adhesive, sealing oils, sealing greases, or gasket that may be otherwise exposed. The shape sufficient to cover all of the epoxy, Cold melt adhesive, sealing oils, sealing greases, or gasket may have a thickness that ensures that all of the epoxy, Cold melt adhesive, sealing oils, sealing greases, or exposed material of the seal 112 is covered. The cap 116 may also have a height that is sufficient, i.e., high enough, to form an insulating and/or protective cover for the seal 112 that prevents the seal 112 them from being completely melted away during injection of the inner-mold 110 plastic. The cap 116 may therefore form a second seal of the electric vehicle charging plug 100.

The faceplate 102 may further include a backet 220 formed in the material of the faceplate that is configured to hold a printed circuit board assembly ("PCBA") 304, which is housed within a potting housing, also called PCBA potting 224. The potting housing 224 may be formed of PP, PBT or PC and be shaped to hold the PCBA 304, which may include an integrated circuit temperature sensor. In order to protect the PCBA 304 from the heat and pressure of the injected inner-mold, the PCBA 304 may be covered by a protective potting compound within the potting housing 224. The potting compound may be a resin, such as polyamide and polyolefin thermoplastics that use a low-pressure molding and a short processing mold cycle. In an embodiment, the potting compound may be Henkel LOCTITE TECHNOMELT PA6208 or OM646 (formerly branded as MACROMELT), or an epoxy resin, polyurethane or a silicone compound.

The integrated circuit temperature sensor of the PCBA 304 may be configured to transmit analog or digital signals including temperature data via data cables 118 to a controller (not shown) that is not part of and is physically separated from the electric vehicle charging plug 100. The data cables 118 may be wrapped by a shield for screening electrical noise so as to accurately capture and convey temperature data. The controller may be part of a power system to which a cable, such as cable 120, of the electric vehicle charging plug 100 is connected and which supplies voltage and current to the electric vehicle charging plug 100. The end of the cable 120 within the inner mold 110 may include a metal clip 122 to secure the cable 120 within the inner mold 110. When the temperature data provided by the PCBA 304 indicates that the temperature within the electric vehicle charging plug 100 has exceeded a temperature threshold, the controller may cause the power system to stop providing voltage and current to the electric vehicle charging plug 100.

Physically separating the controller completely from the electric vehicle charging plug 100 is an important safety feature of the present disclosure. Some existing plug and cable systems locate a controller separate from the plug, but somewhere on the cable that is close to the plug. If an electrical short occurs within the plug and the controller is close enough to the plug to be damaged as a result, the controller may not be able to stop the power system from continuing to provide voltage and current. This may be especially problematic with some electric vehicle plugs that are operating at a higher than standard 110 voltage rating.

Live, neutral and ground cables 124, along with data cables 118, may be housed within cable 120 and positioned close to the pins 106/108 and PCBA 304, at which point they are separated from one another for connection to their respective component of the electric vehicle charging plug 100. The cable 120 may extend through an opening 118 of the inner-mold 110. Both the inner-mold 110 and the over mold 130 include grip indents 132 on either side of the inner-mold and over mold 130 to enable a user of the electric vehicle charging plug 100 to improve their grip of the plug when in use. The over mold may be formed of Thermoplastic Elastomer ("TPE") or Thermoplastic Polyurethane ("TPU") or another suitable material. An upper portion of the over mold may be configured to have a flexible portion 134. The jacket of the cable 120 may also be formed of TPE or TPU or another suitable material, which results in good bonding performance with the over mold of the same material.

The electric vehicle charging plug 100 sealing system and method disclosed herein meets the IP67 waterproof rating, meaning that the electric vehicle charging plug is 100% protected against solid objects like dust and sand, and has been tested to work for at least 30 minutes while under 15 cm to 1 m of water. The electric vehicle charging plug 100 sealing system and method disclosed herein also meets higher waterproof rations up to the IPX9K waterproof rating, meaning that the electric vehicle charging plug resists high-pressure, high-temperature sprays at close range.

FIG. 5 to FIG. 10 illustrate embodiment of the electric vehicle charging plug 500, which is similar to the embodiment described above and includes most of the same components, but includes thermistors instead of a PCBA 304, housings for the thermistors and a slightly different faceplate 502. Negative temperature coefficient ("NTC") or positive temperature coefficient ("PTC") thermistors 504, a type of resistor whose resistance decreases or increases as temperature rises, may be positioned in a housing 506 that surrounds the upper portion of each pin 106/108. The housing 506 may be made of ceramic and may act as housing for thermistors 504. The ceramic may be a highly thermally conductive ceramic, such as Aluminum Nitride, Silicon Carbide, and Aluminum Oxide. Other thermally conductive ceramics include Beryllium Oxide and Boron Nitride, among others. A highly thermally conductive ceramic material may be used to assist in the heat sensing by the thermistors 504. The housing 506 couples the thermistors 504 to a corresponding pin 160/108 to ensure that heat generated by the pin is efficiently transferred to the thermistor 504. If a highly thermally conductive ceramic was not used, when the inner-mold was injected, the plastic material of the inner-mold may form an insulating barrier between the pin and the thermistor 504. Use of the ceramic housing 506 ensures that the inner-mold 110 does not form an insulating barrier between the pin and the thermistor 504. The ceramic housing may also be electrically insulating, which helps to ensure the charging plug is able to pass high voltage test requirements.

A data cable 118 may be connected to each thermistor 504 and configured to transmit analog signals including temperature data to a controller (not shown) that is not part of and is physically separated from the electric vehicle plug, as previously explained herein. When the temperature data provided by the thermistor 504 indicates that the temperature within the electric vehicle charging plug 500 has exceeded a temperature threshold, the controller may cause the power system to reduce current or stop supplying voltage and current.

Live, neutral and ground cables 124, along with data cables 118, may be housed within the jacket of cable 120 until they are close to the pins and thermistors 504, at which point they are separated from one another for connection to their respective component of the electric vehicle charging plug 500.

Figure 8:
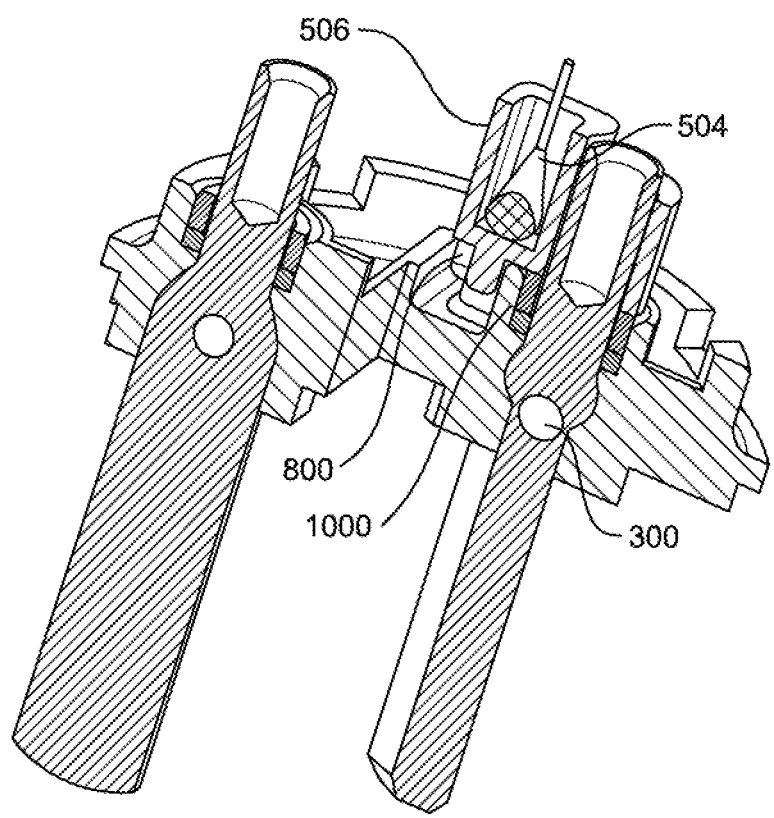
FIG. 8 is a cross-sectional view of the bridge components of FIG. 5.
Figure 9:
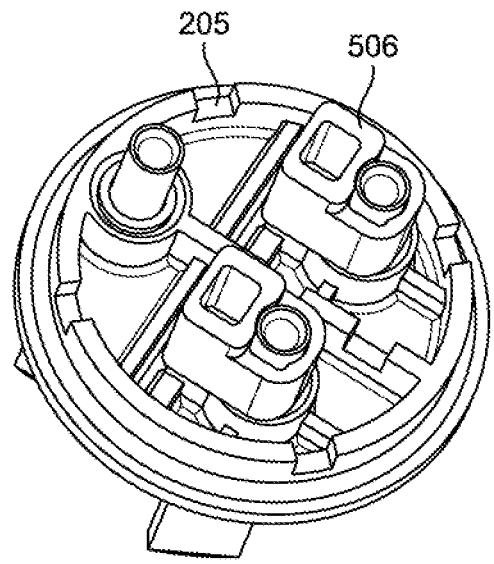
FIG. 9 illustrates a perspective view of an interior side of the bridge components of FIG. 6.
Figure 10:
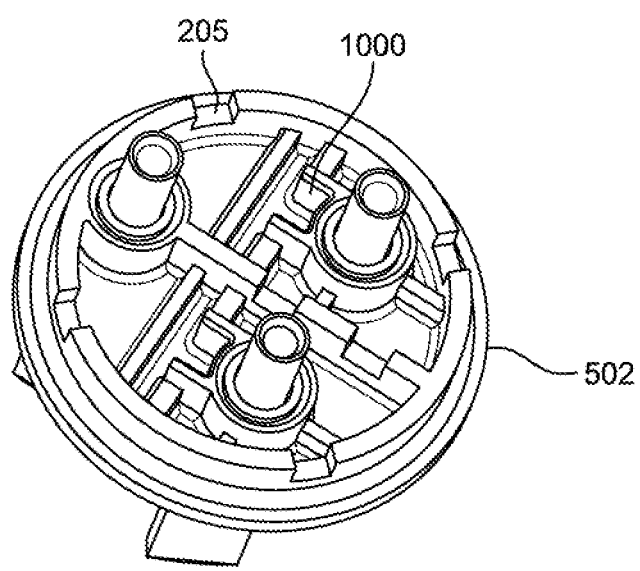
FIG. 10 illustrates a perspective view of the interior side of the bridge of FIG. 9 without the sensor holders.

As further illustrated in FIGS. 6-10, the faceplate 502 may include brackets 1000 that are configured to mate with each holder 506 and keep the holder in position relative to the upper portion of the corresponding pin. The brackets 1000 may be shaped as more fully illustrated in FIG. 10. As shown in FIGS. 8 and 9, the holder 506 may rest partially or fully on the corresponding cap 116 to help keep the cap 116 in position, and may also rest partially on the upper surface of the bracket 1000. The height of the brackets 1000 is slightly higher than the height of the raised portion 204 so as to create an opening 800 under each holder 516. The opening 800 may serve as a nook and cranny as explained above that may be filled with the material of the inner-mold 110 as a result of pressurization during formation of the inner-mold, which serves to keep all of the internal components in place and which forms a third seal of the electric vehicle charging plug 500.

Figure 5:
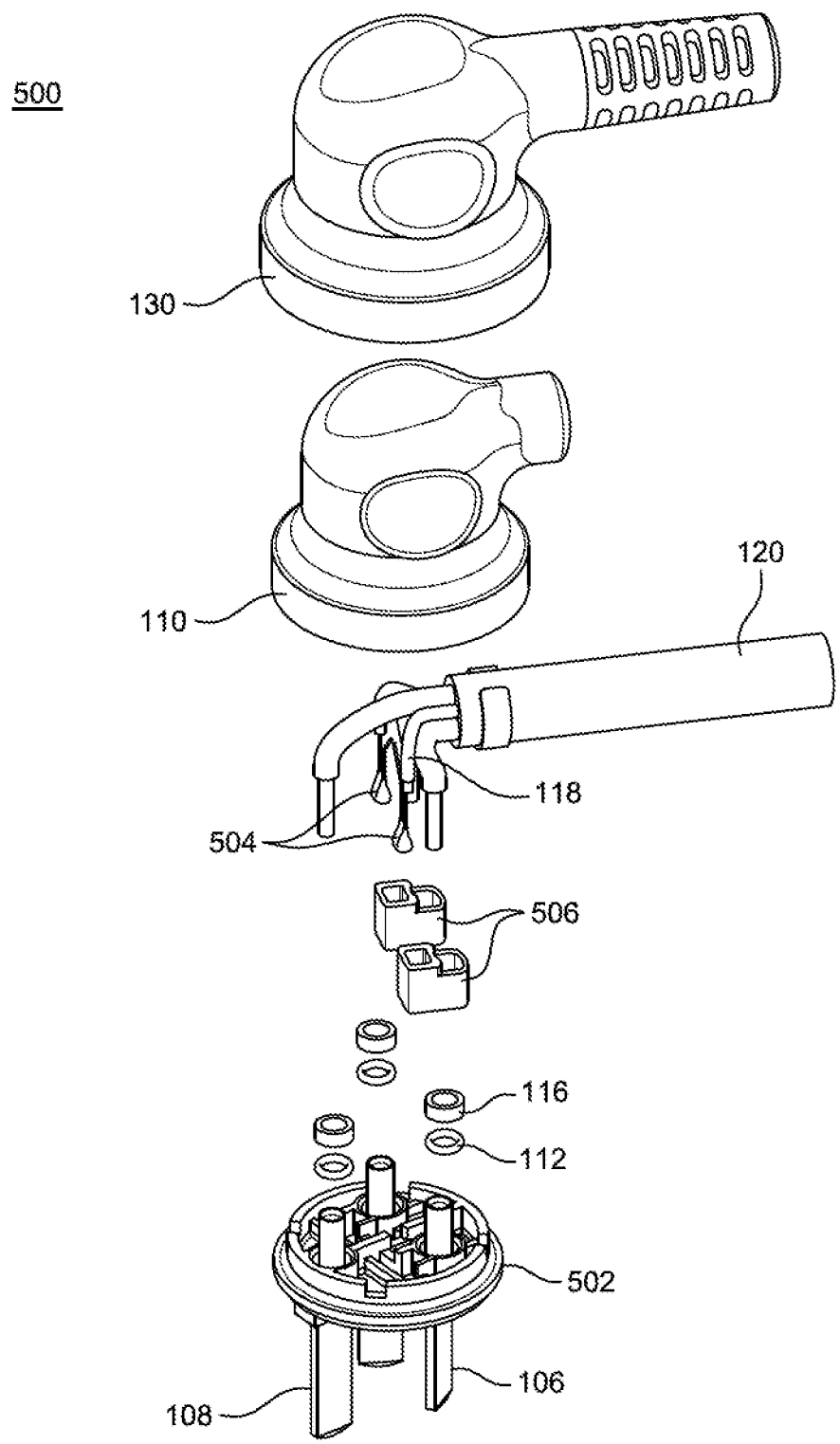
FIG. 5 illustrates an exploded perspective view of an electric vehicle charging plug in accordance with an embodiment of the present disclosure.
Figure 6:
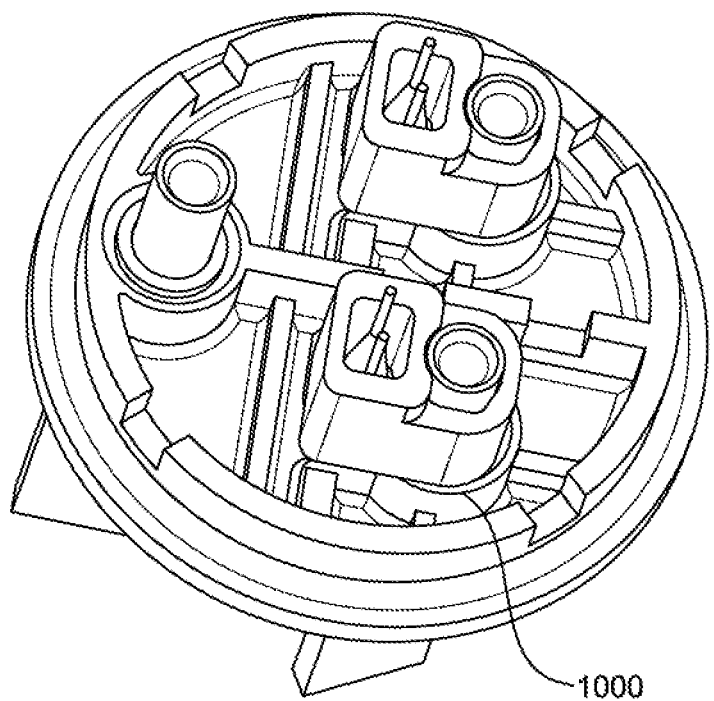
FIG. 6 illustrates a perspective view of the bridge components of the embodiment of FIG. 5 when fully assembled.
Figure 7:
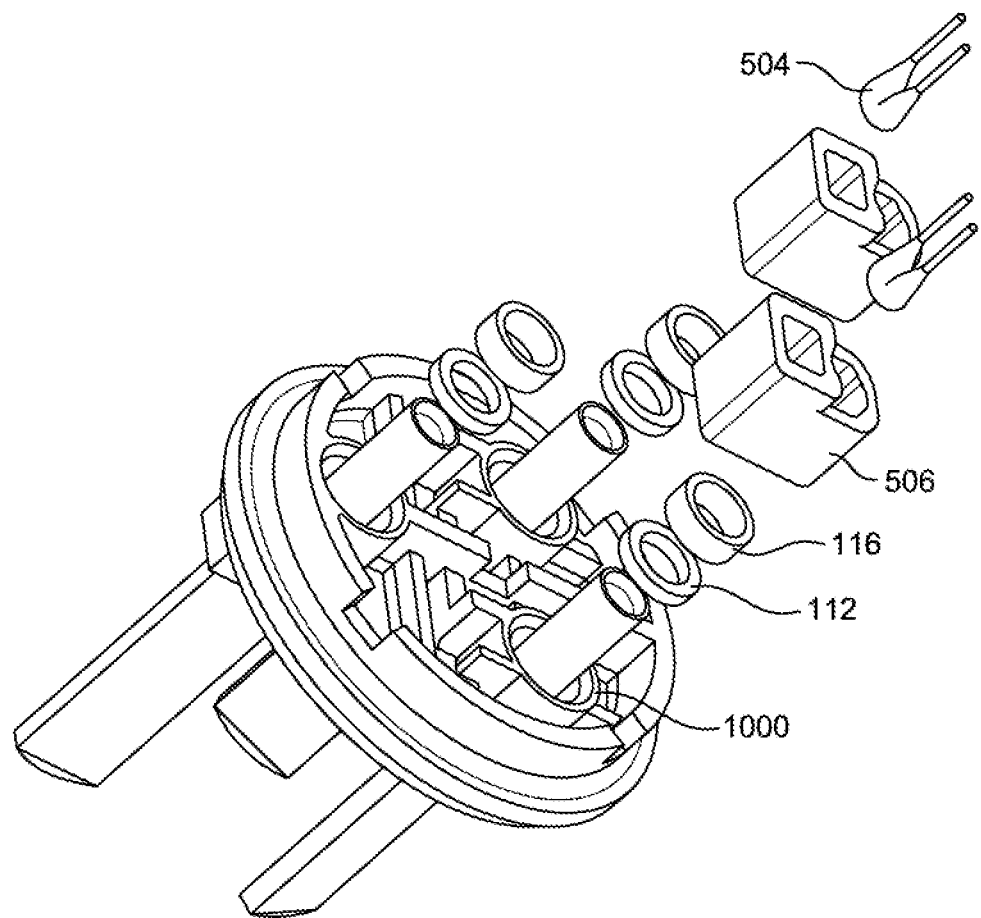
FIG. 7 illustrates an exploded perspective view of the bridge components of FIG. 6.
Figure 11:
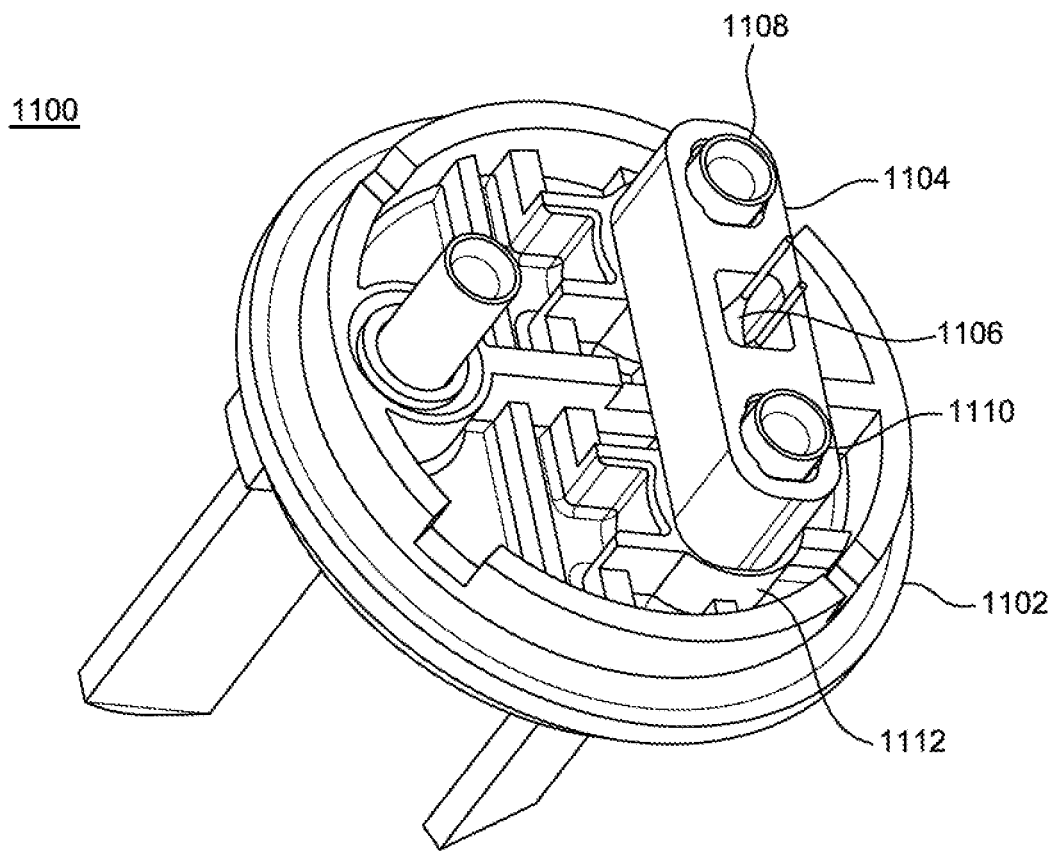
FIG. 11 illustrates a perspective view of the bridge components of an embodiment.

FIG. 11 illustrates an embodiment of an electric vehicle charging plug 1100 similar to the embodiments depicted in FIG. 1 and FIG. 5. The charging plug 1100 includes a faceplate 1102, a single holder or housing 1104, and a single thermistor 1106. The housing 1104 may be formed of a ceramic material. The ceramic material may be a highly thermally conductive ceramic, such as Aluminum Nitride, Silicon Carbide, and Aluminum Oxide. Other thermally conductive ceramics include Beryllium Oxide and Boron Nitride, among others. A highly thermally conductive ceramic material may to assist in the heat sensing by the thermistor 1106. The housing 1104 may couple the thermistor 1106 to the pins 1108 and 1110, which may be the live and neutral pins, to ensure that heat generated by the pins is efficiently transferred to the thermistor 1106. The ceramic housing may also be electrically insulating, which helps to ensure the charging plug is able to pass high voltage test requirements.

Figure 12:
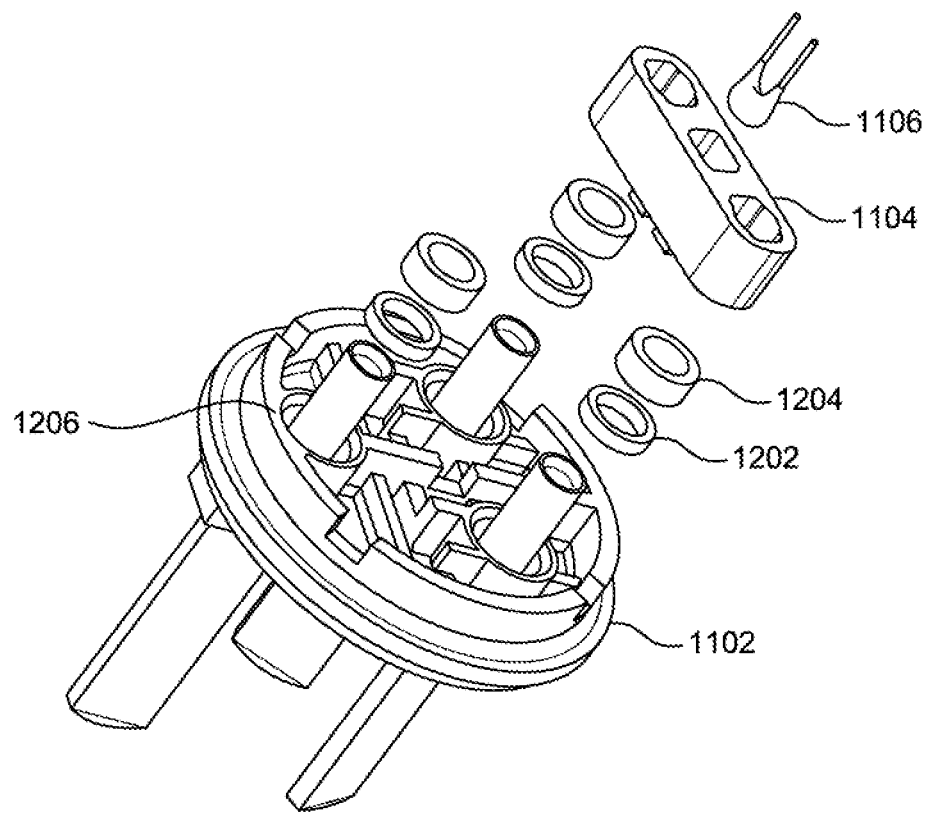
FIG. 12 illustrates an exploded view of the components of FIG. 11.
Figure 13:
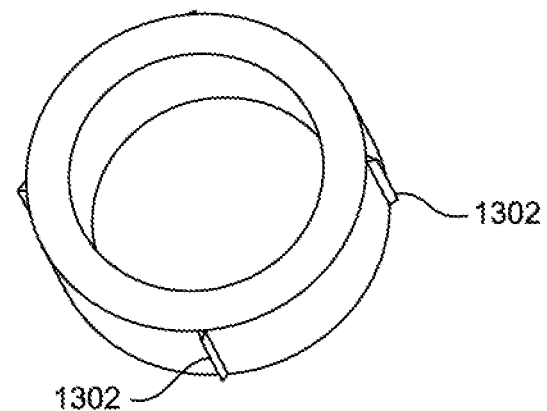
FIG. 13 illustrates a perspective view of details of a second seal in accordance with an embodiment.
Figure 14:
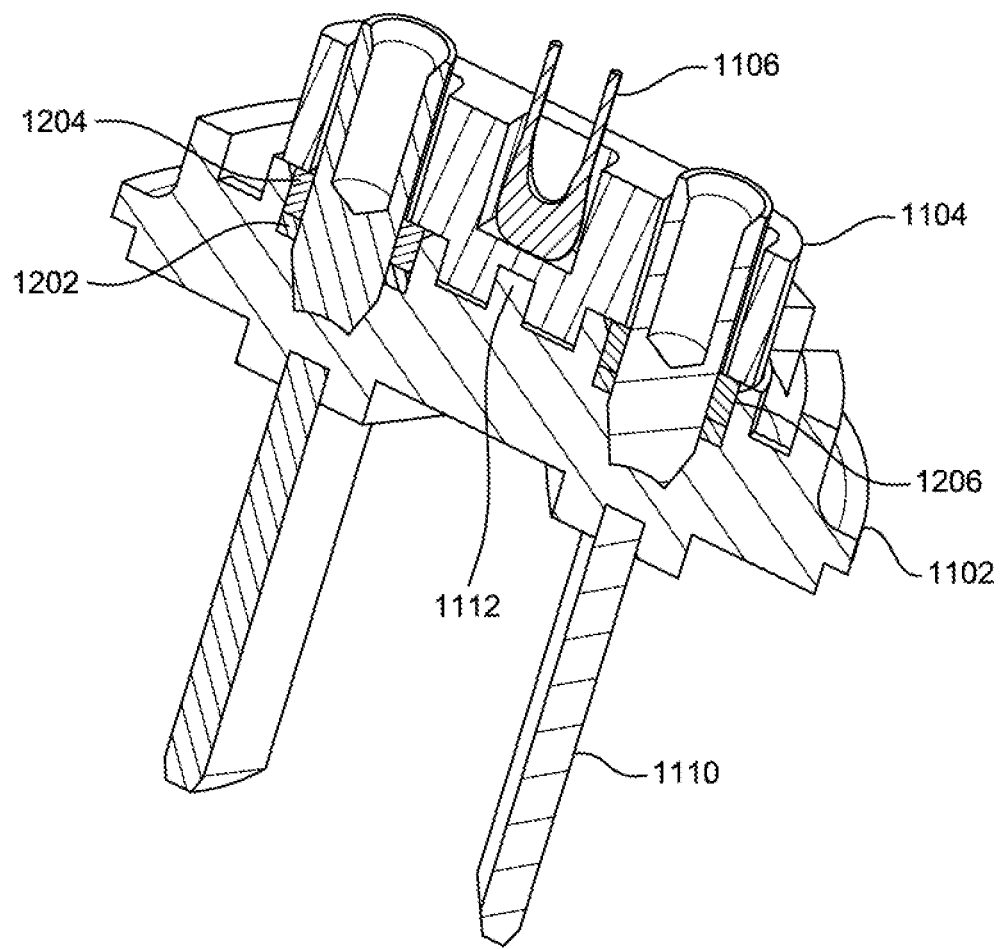
FIG. 14 is a cross-sectional view of the bridge components of FIG. 11.

The thermistor 1106 may be a negative temperature coefficient ("NTC") or positive temperature coefficient ("PTC") thermistor. The thermistor 1106 may be placed between the pins 1108 and 1110 in a central position so it is equally distanced from both pins. The housing 1104 may surround both pins 1108 and 1110 and be held in position by brackets 1112 formed on the interior side of the faceplate 1102. FIG. 12 provides further details of the faceplate 1102, as well as first seals 1202 and second seals 1204, as previously described herein. FIG. 13 provides additional details regarding the second seals or plastic rings 1204. A plurality of interference crush ribs 1302 may be formed around the perimeter of each plastic ring 1204. Although four crush ribs 1302 are shown in FIG. 13, a smaller or larger number may be used. The crush ribs 1302 are very thin and are configured to be crushed and deformed when fit into the slots 1206 of the faceplate 1102 so as to help secure the plastic ring 1204 within the slot 1206. Crush ribs 1302 may be used on the plastic rings 116 of the embodiments of FIG. 1 and FIG. 5 as well. FIG. 14 provides a cross-section view of the embodiment of FIG. 11 to FIG. 12.

Figure 15:
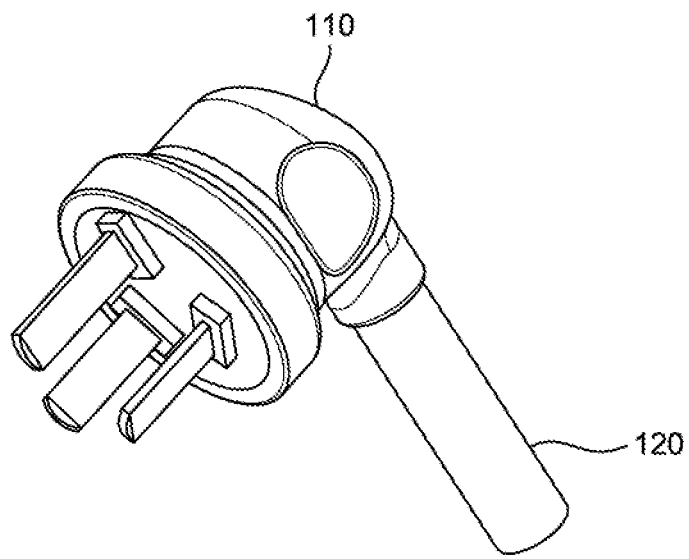
FIG. 15 illustrates a perspective view of electric vehicle charging plug of FIG. 1, FIG. 5 and/or FIG. 11 when an inner-mold is applied in accordance with embodiment of the present disclosure.
Figure 16:
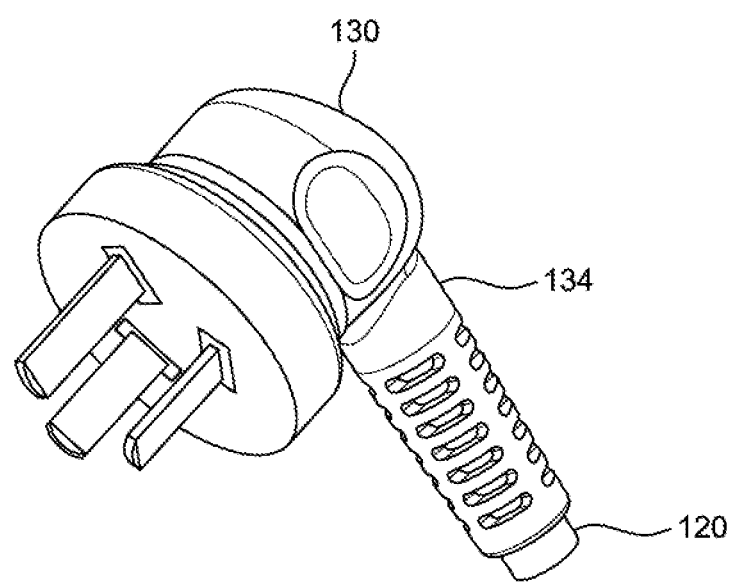
FIG. 16 illustrates a perspective view of the electric vehicle charging plug of FIG. 1, FIG. 5 and/or FIG. 11 when an over mold is applied in accordance with embodiment of the present disclosure.

FIG. 15 illustrates the fully assembled electric vehicle charging plug 100/500 with just the inner-mold 110 exposed and cable 120. FIG. 16 illustrates the fully assembled electric vehicle charging plug 100/500 with just the over mold 130 exposed, flexible portion 134, and cable 120.

The electric vehicle charging plug 500 sealing system and method disclosed herein meets the IP67 waterproof rating, meaning that the electric vehicle charging plug is 100% protected against solid objects like dust and sand, and has been tested to work for at least 30 minutes while under 15 cm to 1 m of water. The electric vehicle charging plug 500 sealing system and method disclosed herein also meets higher waterproof rations up to the IPX9K waterproof rating, meaning that the electric vehicle charging plug resists high-pressure, high-temperature sprays at close range.

Figure 17A:
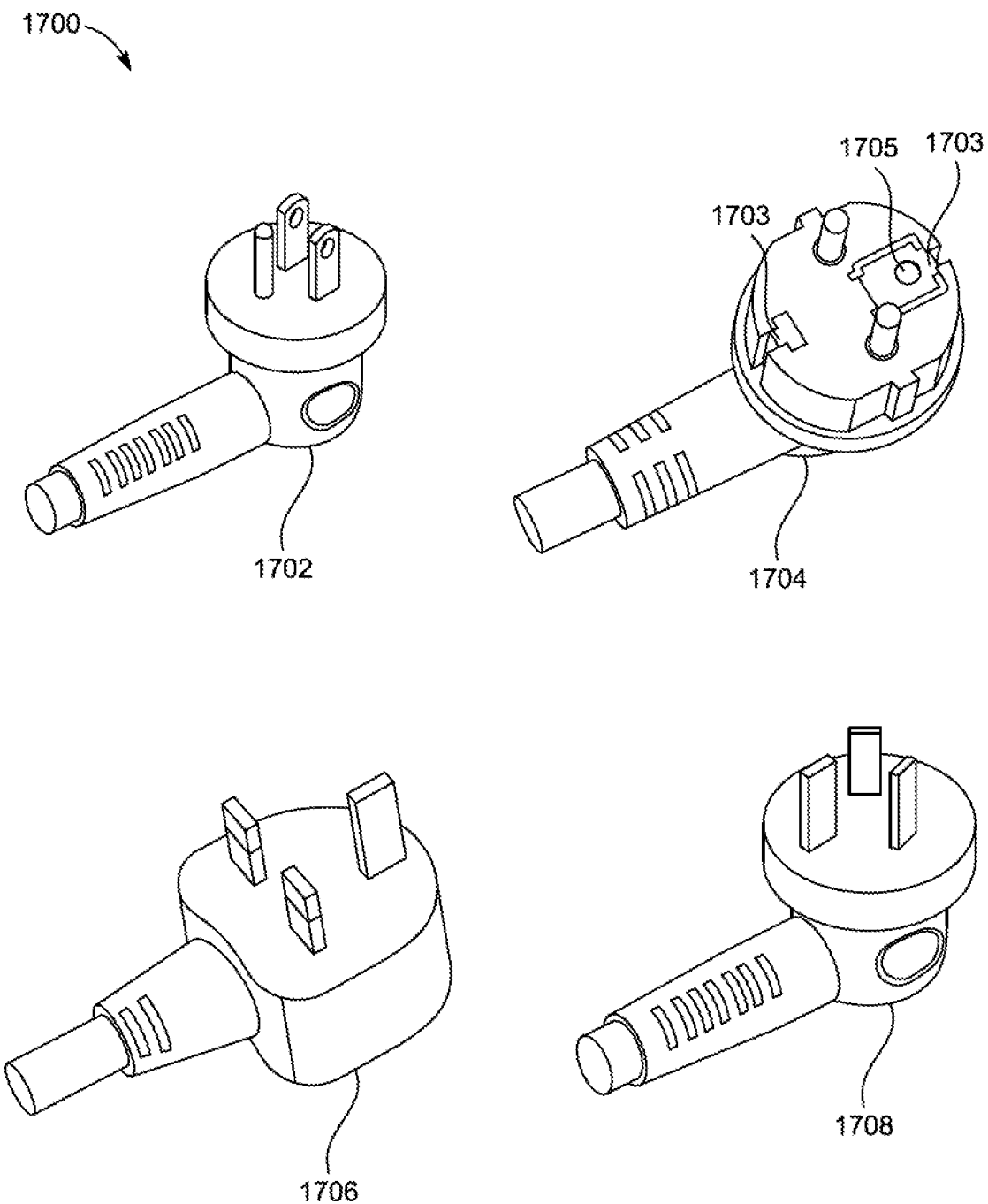
FIG. 17A illustrates a perspective view of a first set of plugs the configurations of which are standardized in a first set of countries.

As noted above, while the electric vehicle charging plugs 100/500/1100 are described in terms of having a pin for ground and blades pins for live and neutral, this is only for the particular standard type of plug that is illustrated in FIGS. 1-16, which corresponds, for example, to a standard plug in China, Australia, or Argentina. Plugs in other countries and for different voltages have different pin and grounding configurations FIG. 17A illustrates a first set 1700 of plugs that are standard in a number of other countries. For example, plug 1702 is a NEMA 5-15 plug that is standard in the United States, the Philippines and Vietnam. Plug 1702 has blade pins for live and neutral and a pin for ground. Plug 1704 is standard for Europe, Korea and Indonesia and only has two pins for live and neutral, but no pin for ground. Instead, plug 1704 includes a set of side contacts 1703 for providing a ground when plugged into a German socket/outlet and a grounding tube 1705 for providing a ground when plugged into a French socket/outlet. Plug 1706 has live and neutral blade pins oriented to be parallel to the horizon while the ground is also a blade oriented to be vertical to the horizon, which may be used, for example, in the United Kingdom. Plug 1708 has three blade pins for live, neutral and ground, with the live and neutral pins at 45-degree angles relative to the ground pin, which may be used, for example, in Argentina.

Figure 17B:
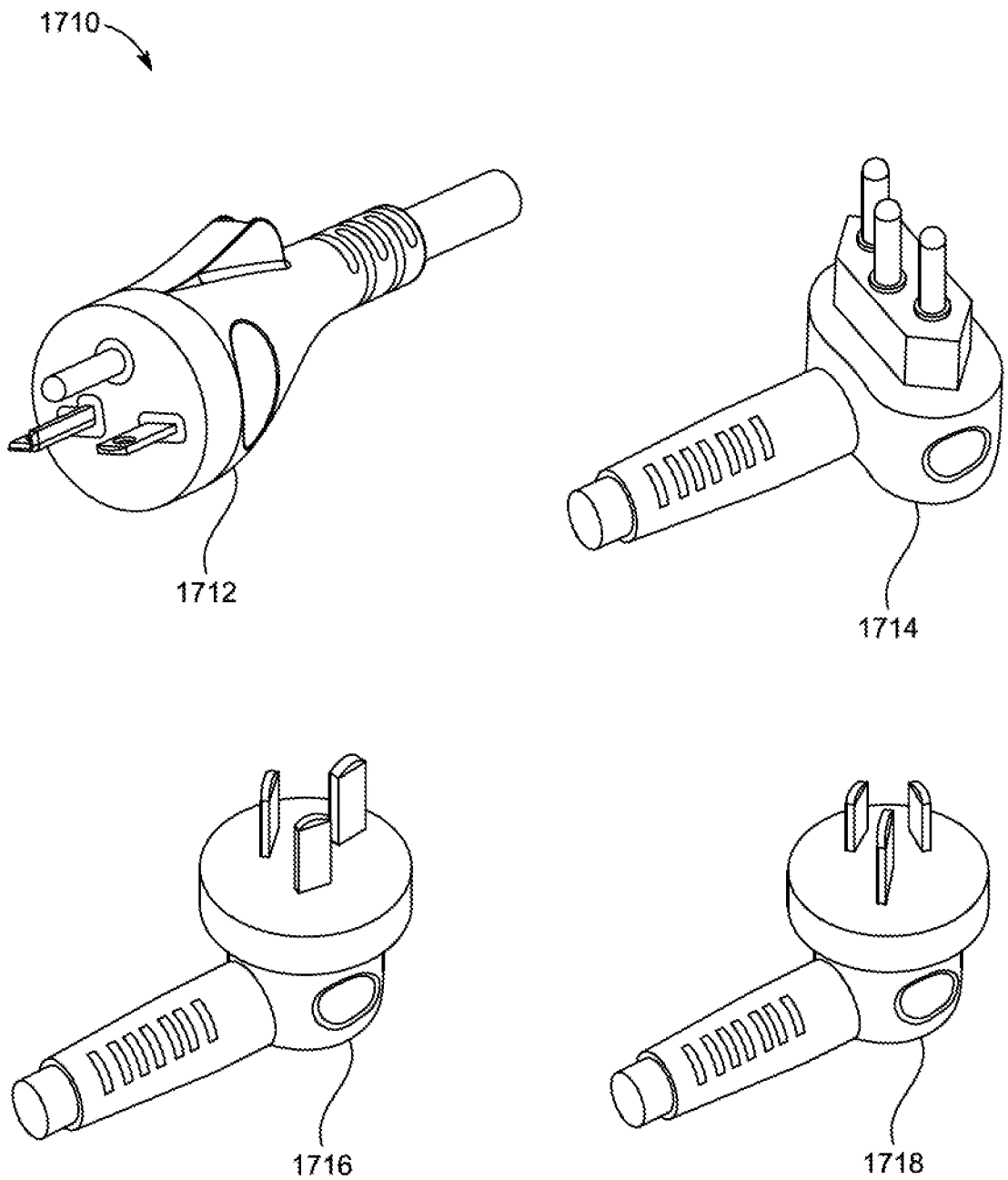
FIG. 17B illustrates a perspective view of a second set of plugs the configurations of which are standardized in a second set of countries.
Figure 17C:
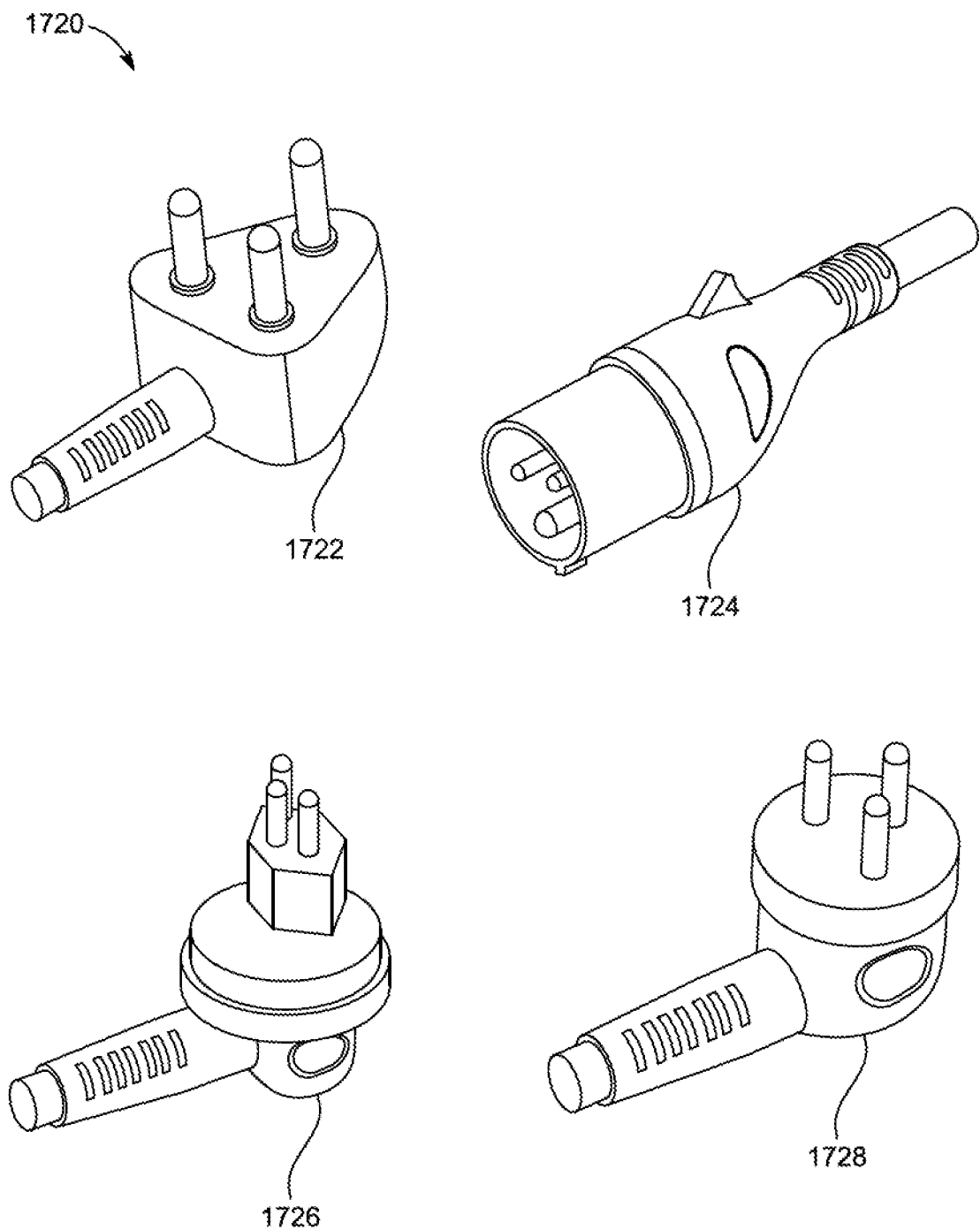
FIG. 17C illustrates a perspective view of a third set of plugs the configurations of which are standardized in a third set of countries.

FIG. 17B illustrates a perspective view of a second set of plugs 1710 that are standard in additional countries, including plug 1712 in Japan, plug 1714 in Brazil, plug 1716 in China (similar to plug 1708 but with the ground pin on top when plugged in rather than on the bottom), and plug 1718 in Australia. FIG. 17C illustrates a perspective view of a third set of plugs 1720 that are standard in further countries, including plug 1722 in South Africa, plug 1726 in Switzerland, and plug 1728 in Thailand. Plug 1724 is an International Electrotechnical Commission (IEC) plug for 200-250 volts that is used in many different countries. The 32-amp version is commonly used to provide power to static camping vehicles and moored boats while the 16-amp version is commonly used to provide power to touring caravans/vehicles and tents.

Figure 17D:
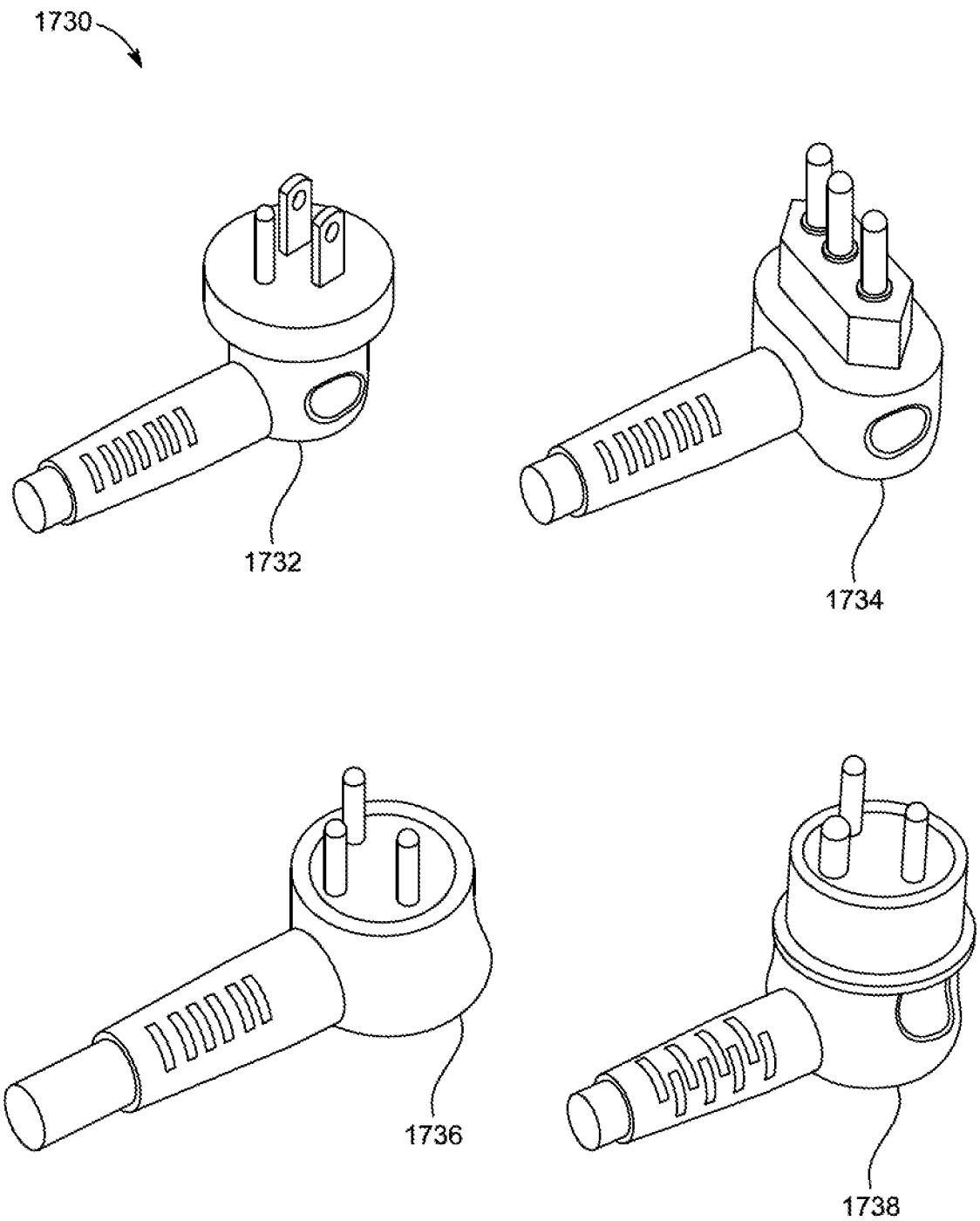
FIG. 17D illustrates a perspective view of a fourth set of plugs the configurations of which are standardized in a fourth set of countries.
Figure 17E:
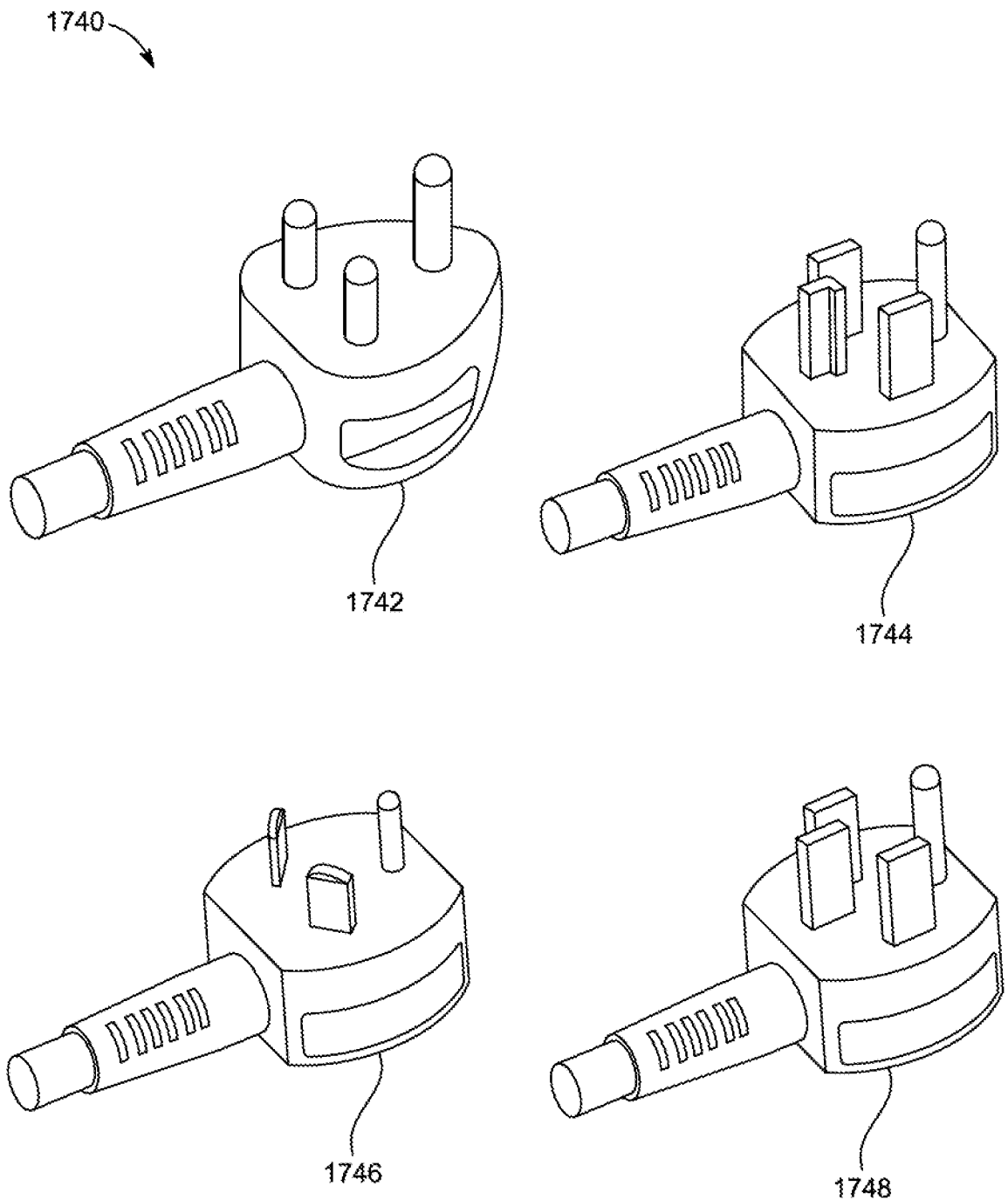
FIG. 17E illustrates a perspective view of a fifth set of plugs the configurations of which are standardized in a fifth set of countries.

FIG. 17D illustrates a perspective view of a fourth set of plugs 1730, including plug 1732 in Taiwan, plug 1734 in Chile and Italy, plug 1736 in Israel, and plug 1738 in Denmark. FIG. 17E illustrates a perspective view of a fifth set of plugs 1740, including plug 1742 in India, plug 1744, a NEMA 14-3-plug in the United States, plug 1746, a TT 30 plug in the United States, and plug 1748, a NEMA 14-50 plug also in the United States.

It will be appreciated that the sealing systems and methods discussed herein are not limited to the depicted embodiments, and other such sealing systems and methods may be applied to form a seal and/or attachment between various elements of the plug, e.g., pins, bridge, cables, cable tubing, wire insulation, housing, and thermistors. While certain embodiments have been described, these embodiments have been presented by way of example only and are not intended to limit the scope of the inventions disclosed herein. For instance, depending on various plug types, number of temperature sensors, such as thermistors, embedded in an electrical plug, configuration of the housing containing the temperature sensors, and the process for assembling the electrical plug may have variants without departing from the spirit of the present disclosure. Indeed, the present disclosure described herein may be embodied in a variety of other forms; furthermore, various omissions, substitutions, and changes in the form of the embodiments described herein may be made without departing from the spirit of the inventions disclosed herein. The accompanying claims and their equivalents are intended to cover such forms or modifications as would fall within the scope and spirit of certain of the inventions disclosed herein.

What is claimed:

1. An electric vehicle plug, comprising:
   two or more pins comprising at least a live pin and a neutral pin, at least the live and neutral pins including a through hole that extends through a central portion of a corresponding pin;
   a ground;
   a faceplate including an outer surface and a plurality of raised portions and lowered portions formed on an inner surface, some of the raised portions partially forming slots through which at least two of the two or more pins extend, and one or more of the raised portions forming a bracket positioned on an inward facing surface of the faceplate, material forming the faceplate filling the through hole of each pin;
   at least one temperature sensor for monitoring a temperature at a location of the at least one temperature sensor;
   a holder for holding the at least one temperature sensor and adjacent either the live pin, the neutral pin, or both the live pin and the neutral pin;
   first seals formed around the two or more pins and positioned on the inward facing surface of the faceplate, the first seals being supported by ledges formed within the slots and configured to fill any openings between the two or more pins and the faceplate;
   second seals formed around the two or more pins and configured to cover the first seals with a material to protect the first seals from pressure and heat associated with an injection molded third seal in a form on an inner-mold that covers at least the second seals and the lowered portions of the faceplate;
   a data cable connected to the at least one temperature sensor and configured to transmit temperature data to a controller that is not part of and is physically separated from the plug; and
   an outer-mold covering the inner-mold and an outer surface of the faceplate.

2. The electric vehicle plug of claim 1, wherein the first seals are formed of one or more of epoxy, Cold melt, sealing oils, sealing greases, Nitrile, Neoprene, Ethylene Propylene, Silicone, Fluorocarbon, and PTFE.

3. The electric vehicle plug of claim 1, wherein the material of the second seals and a material of the faceplate and the third seals are chosen from Polypropylene, Polybutylene Terephthalate and Polycarbonate.

4. The electric vehicle plug of claim 1, wherein the first seals and the second seals have shapes that match shapes of a corresponding ledge.

5. The electric vehicle plug of claim 1, wherein the two or more pins are one of two or more round pins and two or more blades.

6. The electric vehicle plug of claim 1, wherein the at least one temperature sensor is an integrated circuit temperature sensor mounted on a printed circuit board assembly.

7. The electric vehicle plug of claim 6, wherein the holder is a potting housing configured to hold the printed circuit board assembly and cover the printed circuit board assembly with a potting compound to protect the printed circuit board assembly from pressure and heat associated with the injection molded third seal.

8. The electric vehicle plug of claim 1, wherein the at least one temperature sensor includes a first sensor and a second sensor, the holder includes a first holder for holding the first sensor and a second holder for holding the second sensor, and the bracket includes a first bracket and a second bracket, wherein the first holder is positioned adjacent the live pin by the first bracket and the second holder is positioned adjacent the neutral pin by the second bracket.

9. The electric vehicle plug of claim 8, wherein the first sensor and the second sensor are one of a negative temperature coefficient thermistor or a positive temperature coefficient thermistor, and wherein the first holder and the second holder are a thermally conductive ceramic.

10. The electric vehicle plug of claim 1, wherein the ground is one of a ground pin, a ground blade, a set of side contacts, or a grounding tube.

11. The electric vehicle plug of claim 1, wherein the second seals include one or more ribs located around a periphery of the second seals and configured to crush and deform within the slots and secure the second seals.

12. The electrical vehicle of claim 1, wherein each through hole extends through a central longitudinal axis of its corresponding pin.

13. A method of assembling an electric vehicle plug, comprising:
   forming a faceplate including an outer surface and a plurality of raised portions and lowered portions formed on an inner surface, some of the raised portions partially forming slots through which two or more pins are extended, and one or more of the raised portions forming a bracket positioned on an inward facing surface of the faceplate;
   inserting the two or more pins into two or more slots among the slots, the two or more pins comprising a live pin and a neutral pin, each pin including a through hole that extends through a central portion of the pin and is filled by the faceplate;
   holding at least on temperature sensor by a sensor holder, the at least one temperature sensor configured to monitor a temperature at a location of the at least one temperature sensor,
   the sensor holder configured to hold the at least one temperature sensor adjacent either the live pin, the neutral pin, or both the live pin and the neutral pin;
   forming first seals around each of the two or more pins and the inward facing surface of the faceplate, the first seals being supported by ledges formed within the slots;
   forming second seals around each of the two or more pins and covering the first seals with a material to protect the first seals from pressure and heat associated with an injection molded third seal in a form on an inner-mold that covers at least the second seals and the lowered portions of the faceplate;
   connecting a data cable to the at least one temperature sensor, the data cable configured to transmit temperature data to a controller that is not part of and is physically separated from the plug; and
   covering the inner-mold and an outer surface of the faceplate with an outer-mold.

14. The method of claim 13, wherein the first seals are formed of one or more of epoxy, Cold melt, sealing oils, sealing greases, Nitrile, Neoprene, Ethylene Propylene, Silicone, Fluorocarbon, and PTFE, and wherein the material of the second seals and a material of the faceplate and the third seals are chosen from Polypropylene, Polybutylene Terephthalate and Polycarbonate.

15. The method of claim 13, wherein the plurality of raised portions and lowered portions form nooks and crannies in the faceplate that are filled by the third seal.

16. The method of claim 13, wherein the first seals and the second seals have shapes that match shapes of a corresponding ledge.

17. The method of claim 13, wherein the at least one temperature sensor is an integrated circuit temperature sensor mounted on a printed circuit board assembly.

18. The method of claim 17, wherein the sensor holder is a potting housing configured to hold the printed circuit board assembly, further comprising:
   covering the printed circuit board assembly with a potting compound to protect the printed circuit board assembly from pressure and heat associated with the injection molded third seal.

19. The method of claim 13, wherein the at least one temperature sensor includes a first sensor and a second sensor, wherein the first sensor and the second sensor are one of a negative temperature coefficient thermistor or a positive temperature coefficient thermistor, wherein the sensor holder includes a first housing for holding the first sensor and a second housing for holding the second sensor, wherein the first housing and the second housing are a thermally conductive ceramic, wherein the bracket includes a first bracket and a second bracket, and wherein positioning the temperature sensor on the bracket includes positioning the first housing on the first bracket adjacent the live pin and positioning the second housing on the second bracket adjacent the neutral pin.

20. The method of claim 13, wherein the second seals include one or more ribs located around a periphery of the second seals, and wherein forming the second seals includes inserting the second seals into the slots so as to crush and deform the one or more ribs.

* * * * *